(12) United States Patent
Lacroix-Penther et al.

(10) Patent No.: US 7,272,188 B2
(45) Date of Patent: Sep. 18, 2007

(54) DISTRIBUTED PILOT MULTICARRIER SIGNAL DESIGNED TO LIMIT INTERFERENCE AFFECTING SAID PILOTS

(75) Inventors: Dominique Lacroix-Penther, Rennes (FR); Pierre Combelles, Rennes (FR); Michel Alard, Paris (FR)

(73) Assignee: France Telecom, Paris (FR)

( * ) Notice: Subject to any disclaimer, the term of this patent is extended or adjusted under 35 U.S.C. 154(b) by 709 days.

(21) Appl. No.: 10/381,178

(22) PCT Filed: Sep. 20, 2001

(86) PCT No.: PCT/FR01/02936

§ 371 (c)(1),
(2), (4) Date: Sep. 15, 2003

(87) PCT Pub. No.: WO02/25884

PCT Pub. Date: Mar. 28, 2002

(65) Prior Publication Data

US 2004/0062191 A1    Apr. 1, 2004

(30) Foreign Application Priority Data

Sep. 20, 2000   (FR) .................................. 00 11990

(51) Int. Cl.
*H04L 27/28* (2006.01)

(52) U.S. Cl. ....................................................... 375/260

(58) Field of Classification Search ................ 375/144, 375/148, 260, 261, 268, 269, 270, 278, 284, 375/285, 298, 346, 348; 332/103; 370/207, 370/491, 500; 329/318, 319, 320, 349; 455/63.1, 455/114.2, 278.1, 296
See application file for complete search history.

(56) References Cited

U.S. PATENT DOCUMENTS 5,274,629 A    12/1993   Helard et al. .................. 370/50

(Continued)

FOREIGN PATENT DOCUMENTS

FR    2 733 869    11/1996

OTHER PUBLICATIONS

Remvik et al, Fading and Carrier Frequency Offset Robustness for different Pulse Shaping filters in OFDM Remvik et al., 1998, IEEE p. 777-781.*
"Coded Orthogonal Frequency Division Multiplex", Bernard Le Floch et al., Proceedings of the IEEE, vol. 83, No. 6, Jun. 1995, pp. 982-996.

(Continued)

*Primary Examiner*—Khanh Tran
*Assistant Examiner*—Sam K. Ahn
(74) *Attorney, Agent, or Firm*—Westman, Champlin & Kelly

(57) ABSTRACT

A multicarrier signal, which includes a temporal succession of symbols formed by a set of data elements, each of said data elements modulating a carrier frequency of the signal. The data elements include reference elements called pilots, whereof the value in transmission is known to at least one receiver designed to receive the signal and informative data elements, whereof the value in transmission is not known a priori to the at least one receiver. One of the caffier frequencies is modulated, at a given time, by one of the data elements, being called a carrier. At least one constraint is imposed on the value of at least one of the informative data elements, so as to reduce, in reception, at least one term of interference affecting at least one of the pilots.

24 Claims, 2 Drawing Sheets

U.S. PATENT DOCUMENTS 6,226,337 B1 * 5/2001 Klank et al. .................. 375/367
6,961,364 B1 * 11/2005 Laroia et al. ................ 375/132
7,061,997 B1 * 6/2006 Eberlein et al. ............ 375/332

OTHER PUBLICATIONS

"Optimal Finite Duration Pulses for OFDM", Anders Vahlin et al., IEEE Transactions on Communications, vol. 44, No. 1, Jan. 1996, pp. 10-14.

* cited by examiner

Symb. 0 :  x . . . . . . . . . . . . x . . . . . . . . . . . . x . . . . . . . . . .
Symb. 1 :  . . . x . . . . . . . . . . . . x . . . . . . . . . . . . x . . . . . . .
Symb. 2 :  . . . . . . x . . . . . . . . . . . x . . . . . . . . . . . . x . . . .
Symb. 3 :  . . . . . . . . . x . . . . . . . . . . . . x . . . . . . . . . . . . x .
Symb. 4 :  x . . . . . . . . . . . . x . . . . . . . . . . . . x . . . . . . . . . .
Symb. 5 :  . . . x . . . . . . . . . . . . x . . . . . . . . . . . . x . . . . . . .

Fig. 1

DISTRIBUTED PILOT MULTICARRIER SIGNAL DESIGNED TO LIMIT INTERFERENCE AFFECTING SAID PILOTS

CROSS-REFERENCE TO RELATED APPLICATION

This Application is a Section 371 National Stage Application of International Application No. PCT/FR01/02936, filed Sep. 20, 2001 and published as WO 02/25884 on Mar. 28, 2002, not in English.

FIELD OF THE INVENTION

The invention relates to the field of transmission and broadcasting of digital information. The invention concerns particularly, but not exclusively, transmission and broadcasting of digital information with a high spectral efficiency, over a limited frequency band, for example in a radiomobile environment.

BACKGROUND OF THE INVENTION

The multicarrier modulation technique, associated for example with an error correction coding technique and interlacing, provides an efficient solution to the problem of broadcasting or transmission of information, for example in a radiomobile environment. Thus, the COFDM (Coded Orthogonal Frequency Division Multiplexing) modulation technique was selected for the DAB (Digital Audio Broadcasting), DVB-T (Digital Video Broadcasting—Terrestrial) and HIPERLAN/2 (High Performance Local Area Network) standards.

The multicarrier modulation used in COFDM system described for example in French patent document No. FR 2 765 757, comprises aparticularly simple equalization system based on the insertion of a guard interval. This guard interval, also called a cyclic prefix, behaves well faced with echoes, at the cost of a loss in spectral efficiency. New multicarrier modulations are currently being studied in order to avoid this loss, or at least to reduce it. Among these new multicarrier modulations, the invention is particularly applicable to OFDM/OQAM (Orthogonal Frequency Division Multiplexing/Offset Quadrature Amplitude Modulation) modulation, for which the carriers are shaped by Iota prototype function. Note that the Iota prototype function, described for example in patent document No. FR 2 733 869, has the characteristic that it is identical to its Fourier transform. The invention is obviously equally applicable to any other type of multicarrier modulation, particularly of the OFDM/OQAM type regardless of the associated prototype function.

Obviously, the process for shaping an electrical signal starting from the information to be transmitted depends on the conditions under which such a signal is transmitted. The characteristics of a transmission channel are summarised briefly below, particularly in a radiomobile environment, in order to better understand the advantage of using multicarrier modulations on such a channel.

In a radiomobile environment, the emitted wave is reflected many times along its route, and therefore the receiver receives a sum of delayed versions of the emitted signal. Each of these versions is attenuated and its phase is shifted at random. This phenomenon, known under the term "delay spread", generates inter-symbol interference (ISI). For example, in an urban type environment, delay spreading is of the order of a few microseconds or less.

The receiver (for example the mobile radiotelephone of a car driver) is assumed to be moving, and hence the Doppler effect also acts on each path, which results in a frequency shift in the received spectrum proportional to the movement speed of the receiver. Note that there are also other types of Doppler effects, all of which can be taken into account by the technique implemented according to the invention.

A combination of these effects results in a non-stationary transmission channel with deep fading at some frequencies (therefore a frequency selective channel is obtained). For some applications, particularly useful for the purposes of the invention, the transmission band is wider than the channel coherence band (in other words the band for which the channel frequency response can be considered as being constant for a given duration). Therefore, fading appears in the band, in other words, at a given moment, some frequencies of the band are strongly attenuated.

In order to overcome these different phenomena (due to the ISI and the Doppler effect), it was envisaged to add a guard interval, particularly in OFDM type systems, during which information will not be transmitted so as to guarantee that all received information originates from the same symbol. In the case of a coherent demodulation of sub-carriers, the distortion due to the channel is then corrected by estimating its value at all points in the time-frequency network.

The introduction of such a guard interval reduces the problems related to inter-symbol interference, but one disadvantage of this technique according to prior art is that its spectral efficiency is low, since no useful information is transmitted during the guard interval.

Therefore, for the purposes of the invention, an attempt was made to find a technique capable of reducing the inter-symbol interference affecting multicarrier signals, without introducing a guard interval.

The main characteristics of a multicarrier modulation are summarised below, to give better understanding of interference phenomena between symbols and/or carriers of a multiplex. A multicarrier modulation is above all a digital modulation, in other words a process for generation of an electromagnetic signal, starting from digital information to be transmitted. The innovation and the advantage of such a modulation is to cut the frequency band allocated to the signal into a plurality of sub-bands, chosen with a width narrower than the channel coherence band, and on which the channel can therefore be considered as being constant during the transmission period of a symbol. Digital information to be transmitted during this period is then distributed on each of the sub-bands, so as to:

reduce the modulation speed (in other words increase the symbol duration) without modifying the transmitted throughput;

make a simple model of the action of the channel on each of the sub-bands, with reference to the complex multiplier model.

In reception, an uncomplicated system for correction of received data (consisting of making a complex division by the estimated channel) makes it possible to satisfactorily recover information emitted on each of the carriers, except for carriers for which deep fading occurred. In this case, if no measures are taken to protect the information, the data transported by these carriers will be lost. Therefore, a multicarrier system is only interesting if generation of the electrical signal is preceded by digital data processing, for example such as error correction coding and/or interlacing.

In particular, at the moment, two types of orthogonal multicarrier modulations are known, for example described in patent document No. FR 2 733 869, and for which the characteristics are summarised below.

All carriers in a multicarrier modulation form a multiplex. Each of the carriers of this multiplex is shaped using the same prototype function denoted g(t) that characterises the multicarrier modulation. We will use $v_0$ to denote the spacing between two adjacent multiplex carriers, and $\tau_0$ to denote the time spacing between two emitted multicarrier symbols. The signal emitted at each instant $n\tau_0$ on the $m^{th}$ sub-band with central frequency $v_m$ is $a_{m,n}e^{i\phi_{m,n}}e^{2i\pi v_m t}g(t-n\tau_0)$, in which the $a_{m,n}$ terms represent the digital data to be transmitted. The expression of the signal emitted in low band (centred around frequency $Mv_0$) is then:

$$s(t) = \sum_n \sum_{m=0}^{2M-1} a_{m,n} e^{i\varphi_{m,n}} e^{2i\pi m v_0 t} g(t - n\tau_0) \quad (I)$$

Note that we have considered the case of a signal with an even number of frequency sub-bands, for simplification purposes. Obviously, the signal could be written more generally in the following form:

$$s(t) = \sum_n \sum_{m=0}^{M-1} a_{m,n} e^{i\varphi_{m,n}} e^{2i\pi m v_0 t} g(t - n\tau_0)$$

Remember that according to one conventional technique, digital data $a_{m,n}$ with a zero value on the edges of the spectrum are input, which modifies the number of terms actually used in the above sum, and for example leads to an even number of carriers.

The $g_{m,n}(t)=e^{i\phi_{m,n}}e^{2i\pi m v_0 t}g(t-n\tau_0))$ functions are called "time-frequency" translated functions of g(t). To find the information transmitted by each sub-carrier, you need to choose g(t) and the phases $\phi_{m,n}$ such that the "time-frequency" translated functions given above can be separated. A sufficient condition to satisfy this separability property is that the translated functions should be orthogonal, in the sense of a scalar product defined on a set of finite energy functions (which is a Hilbert space in the mathematical sense).

Note that the following two scalar products can be calculated on the finite energy functions space:
the complex scalar product $$\langle x/y \rangle = \int_R x(t) y^*(t) d t$$

the real scalar product $$\langle x/y \rangle_R = \text{Re} \int_R x(t) y^*(t) d t$$

Thus, two types of multicarrier modulations are defined:
a complex type multicarrier modulation, for which the g(t) function chosen guarantees orthogonality of its translated functions in the complex sense. For example, this is the case for OFDM modulation, also called OFDM/QAM (Orthogonal Frequency Division Multiplexing/Quadrature Amplitude Modulation). For this type of modulation, $\phi_{m,n}=0$ and the data $a_{m,n}$ are complex.

a real time multicarrier modulation, for which the g(t) function chosen enables orthogonality of its translated functions in the real sense. For example, this is the case of the OFDM/OQAM, OFDM/OMSK (Offset Minimum Shift Keying) or OFDM/OQAM/IOTA modulations. For this type of modulation, $\phi_{m,n}=(\pi/2)*(m+n)$ and the $a_{m,n}$ data are real.

The characteristics of these two types of modulations induce significant differences, particularly in terms of the time-frequency network density associated with the modulation considered.

Remember that these multicarrier modulations are designed to transmit information at high speed, and consequently their spectral efficiency is fairly high, and in particular can reach 4 bits/Hz (for example in the case of a digital television). The transformation of bits output from an error correction encoder in modulation symbols (mapping) will thus be of the QAM (Quadrature Amplitude Modulation) type.

A complex variable output from the QAM constellation is therefore transmitted differently depending on the multicarrier modulation type used.

Thus, for a complex type modulation, the real and imaginary parts of a complex output from the QAM constellation are transmitted simultaneously, every symbol time $T_s$; on the other hand, in the case of a real type modulation, the real and imaginary parts are transmitted with a time offset of a half symbol time ($T_s/2$) (this is called the Offset QAM or OQAM).

Therefore, for a particular transmission band and for a given number of sub-carriers, the transmission rate of real type multicarrier symbols to carry the same throughput has to be twice the transmission rate of complex type multicarrier symbols.

Furthermore, these two information transmission modes are characterised by the density of the associated time-frequency network $d=1/(v_0 \tau_0)$. Thus, real type multicarrier modulations correspond to a density $d=2$, whereas complex type multicarrier modulations correspond to a density $d=1$.

The distinct characteristics of firstly real type multicarrier modulations, and secondly complex type multicarrier modulations, require different processing when making an estimate of the transmission channel. In the case of a real type multicarrier modulation, and as described in the rest of this document, the channel estimating process is made more difficult because all that is available is an orthogonality of the translated functions in the real sense. In order to get a better understanding of this problem, we will now try to describe known channel estimating techniques for a multicarrier modulation as presented above.

In the rest of the reasoning, it is assumed that the multicarrier modulation parameters are chosen such that the channel can be considered as being practically constant on each of the sub-carriers (multiplication channel), for each OFDM symbol. The channel can then be modelled by a complex coefficient to be estimated, $H_{m,n}$ (where m is the sub-carrier index and n is the index of the OFDM symbol considered).

One conventional technique for estimating the channel in OFDM consists of inserting reference carriers in the useful carrier flow, at positions known to the receiver. In reception, the values adopted by these reference carriers, called pilots, are read and it is easy to deduce the complex channel gain at these reference positions from them. The complex gain of the channel on all points in the transmitted time-frequency network is then derived from the calculated value of the complex gain at the reference positions.

In particular, in the context of the OFDM/QAM, a method was considered based on the use of an estimate by scattered pilots. The pilots are scattered according to a regular pattern in the time-frequency plane, and are used to measure an under sampled version of the channel. The next step is to make a two-dimensional interpolation to determine the value of the channel at all points in the time-frequency network. For example, this method is used in the DVB-T standard (Digital Video Broadcasting—DVB); Framing Structure, channel coding and modulation for digital terrestrial television (DVB-T), Digital Video Broadcasting (DVB); ETS 300 744, March 1997), and is illustrated in FIG. 1 in which 6 OFDM symbols numbered from 0 to 5 are shown. Each cross (x) represents a reference carrier, and each dot (.) represents useful data to be transmitted.

Therefore, the invention presented in this document is more particularly applicable to this method, called the scattered pilots channel estimating method.

In the case of an OFDM/OQAM (Offset QAM) type multicarrier modulation, the channel estimating process is made more difficult because all that is available is orthogonality of the translated functions in the real sense. To estimate the complex gain of the channel on a given sub-carrier, the complex projection of the signal received on the considered sub-carrier needs to be made. In this case, orthogonality of the translated functions in the real sense and the fact that the prototype functions, even if they are optimally located in time and frequency, extend to infinity over at least one of the time and frequency axes, means that there will be (intrinsic) interference between carriers, even on an ideal channel.

Within the framework of a real type multicarrier modulation, the imaginary part of the projection of the received signal based on translated functions of the prototype function is not zero. A disturbing term then appears, which is added to the demodulated signal, which will have to be corrected before the channel is estimated. Therefore, it is necessary to think of methods of compensating for this lack of complex orthogonality, thus overcoming the disadvantages of this technique according to prior art.

According to the technique presented above, the complex projection of a multicarrier signal r(t) received at point $(m_0, n_0)$ in the time-frequency space is used to estimate the channel $\hat{H}m_0,n_0$ at this position. Thus, if $\sqrt{E}$ is emitted in $(m_0,n_0)$, we have $$\hat{H}_{m_0,n_0} = \frac{\int r(t) g^*_{m_0,n_0}(t) dt}{\sqrt{E}}$$

Therefore, assuming that the channel is ideal (r(t)=S(t)), we should have $\hat{H}m_0,n_0=1$.

Now $$\int s(t) g^*_{m_0,n_0}(t) = \sqrt{E} + \underbrace{\sum_{(m,n) \neq (m_0,n_0)} a_{m,n} \int g_{m,n}(t) g^*_{m_0,n_0}(t)}_{1_{m_0,n_0} \in_i R} \quad (II)$$

Equation (II) represents the fact that the complex projection of the perfectly transmitted signal is nevertheless affected by ISI (Inter-symbol interference) intrinsic to OFDM/OQAM modulations. ISI includes interference between time symbols and/or between carriers.

The existence of this intrinsic ISI that disturbs the transmission channel estimate, is a major disadvantage of this technique according to prior art.

In particular, the purpose of the invention is to overcome these disadvantages according to prior art.

More precisely, one purpose of the invention is to supply a multicarrier modulation technique to reduce intrinsic interference between symbols and/or between carriers.

Another purpose of the invention is to implement a multicarrier modulation technique that is simple and costs little to implement.

Another purpose of the invention is to supply a multicarrier modulation technique adapted to OFDM/OQAM type systems.

Another purpose of the invention is to implement a multicarrier modulation technique through which the scattered pilot channel estimating method can be adapted to OFDM/OQAM type signals.

Another purpose of the invention is to supply a multicarrier modulation technique for implementing a scattered pilot channel estimating method that is more precise than methods used according to prior art.

Another purpose of the invention is to implement a multicarrier modulation technique enabling improved reception, demodulation and decoding of the emitted multicarrier signal.

SUMMARY OF THE INVENTION

These purposes, and others that will become clear later, are achieved by means of a multicarrier signal consisting of a temporal succession of symbols formed by a set of data elements, each of said data elements modulating a carrier frequency of said signal, the said data elements comprising firstly reference elements called pilots, for which the value at emission is known to at least one receiver that will receive the said signal, and secondly informative data elements for which the value at emission is not known to said receiver(s) in advance, one of said carrier frequencies modulated, at a given point in time, by one of said data elements being called a carrier, at a given instant.

According to the invention, at least one constraint is imposed on the value of at least one of said informative data elements, in order to obtain the reduction of at least one interference term affecting at least one of said pilots, at reception.

Thus, the invention is based on a completely new and inventive approach to the reduction of phenomena inherent to the intrinsic interference between symbols and/or between carriers, affecting the multicarrier signals. At the moment, the technique used to reduce problems related to intrinsic interference, particularly for COFDM/QAM systems, consists of introducing a guard interval during which no useful information is transmitted, so as to guarantee that all received data belong to the same symbol. However, such a solution reduces the information flow that can be transmitted. Therefore, the invention is based on an innovative technique to reduce interference phenomena, involving a multicarrier modulation with distributed pilots consisting of imposing one or several constraints on the value of one or several informative data elements that are to be transmitted, so as to reduce the ISI (inter-symbol interference) that makes a correct channel estimate more difficult.

Advantageously, an OFDM/OQAM type signal is used.

The main advantage is to reduce the intrinsic interference between symbols and/or between carriers for real type modulations, particularly in order to make a channel estimate by scattered pilots. As already described above, the channel estimating process is more difficult for OFDM/OQAM type signals for which all that is available is orthogonality of translated functions in the real sense. Therefore, it is particularly useful to attempt to improve the channel estimate for this type of multicarrier signals.

Preferably, one of said constraints consists, for at least one pilot, of cancelling an interference term at least partially due to carriers directly neighboring said pilot in the time-frequency space.

Thus, interference affecting a given pilot due to carriers belonging to the first ring surrounding this pilot, in other words due to carriers directly adjacent to the pilot considered, is cancelled firstly in the time space, and secondly in the frequency space. It is also possible to cancel the interference due to the second ring surrounding a pilot, composed of carriers directly adjacent to the carriers in the first ring, firstly in the time space and secondly in the frequency space. It is also possible to cancel the interference affecting a given pilot due to rings 1 to N surrounding this pilot, in which N>2.

According to one advantageous characteristic, this type of signal is in the following form:

$$s(t) = \sum_n \sum_{m=0}^{M-1} a_{m,n} e^{i\varphi_{m,n}} e^{2i\pi m v_0 t} g(t - n\tau_0),$$

where g is a predetermined prototype function such that said carriers are orthogonal, and in which the terms $a_{m,n}$ are real and represent said data elements, $\tau_0$ is the duration of one of said symbols and $v_0$ is the spacing between said carrier frequencies, where $1/(v_0\tau_0)=2$, and where $\varphi_{m,n}=(\pi/2)*(m+n)$, where m and n are characteristic of the position in the frequency space and in the time space respectively of the carrier carrying the data element $a_{m,n}$.

As mentioned above, zero value data elements are conventionally introduced on spectrum edges. Thus, for example, the number of zero data elements can be chosen so as to implement an even number of useful carriers.

According to one advantageous technique, this type of signal respects the following constraint:

$$\alpha_1(a_{m_0+1,n_0}-a_{m_0-1,n_0})+(-1)^{n_0}\alpha_2(a_{m_0,n_0+1}-a_{m_0,n_0-1})-$$
$$\beta(a_{m_0+1,n_0+1}+a_{m_0-1,n_0+1}+a_{m_0+1,n_0-1}+a_{m_0-1,n_0-1})=0$$

$$A_g(0,v_0)=A_g(0,-v_0)=\alpha_1$$

where $$A_g(\tau_0,0)=A_g(-\tau_0,0)=\alpha_2$$

$$A_g(\tau_0,v_0)=A_g(-\tau_0,v_0)=A_g(-\tau_0,-v_0)=A_g(\tau_0,-v_0)=\beta$$

and in which $A_g$ is the ambiguity function of the said function g, $m_0$ and $n_0$ are characteristic of the pilot for which the interference is to be cancelled.

Appendix 1 contains the characteristics of an ambiguity function. This type of constraint also cancels the interference term associated with the first ring surrounding a given pilot.

Advantageously, said function g is a real, and, isotropic even-parity function.

It is thus checked that:

$$A_g(0,v_0)=A_g(0,-v_0)$$

$$A_g(\tau_0,0)=A_g(-\tau_0,0)$$

$$A_g(\tau_0, v_0)=A_g(-\tau_0, v_0)=A_g(-\tau_0, -v_0)=A_g(\tau_0, -v_0)$$

Advantageously, said function g is the Iota function.

The Iota function is a particularly attractive prototype function for the purposes of the OFDM/OQAM multicarrier modulation, because it has the characteristic that it is identical to its Fourier transform. By using the Iota prototype function denoted $\Im$, it is certain that $\alpha_1=\alpha_2$. It is recalled that the Iota function is described particularly in patent document No. FR 2 733 869.

Preferably, said constraint is respected using a linear transformation to fix at least one degree of freedom on a set containing at least one ring comprising said carriers neighboring said pilot $(m_0,n_0)$ Preferably, said constraint is respected by applying a linear transformation to fix a degree of freedom on a ring containing said carriers directly adjacent to said pilot $(m_0, n_0)$.

Advantageously, the said transformation is unitary.

The use of a linear and unitary transformation enables conservation of energy and prevents the appearance of large energy differences between the different carriers forming the ring(s) on which an attempt is made to reduce and/or cancel intrinsic interference.

According to one advantageous characteristic, the energy associated with each of said pilots is significantly greater than the average energy of said carriers modulated by an informative data element.

By boosting the energy of the pilots in proportion to the average energy of carriers transporting the useful information, pilots are provided with better protection against transmission channel distortions. This increases the channel estimating quality.

Preferably, said pilots form a regular pattern in the time-frequency space, two consecutive pilots, firstly in the time space, and secondly in the frequency space, being separated by at least two carriers.

This guarantees that the first rings associated to two consecutive pilots in the time space or in the frequency space do not overlap, in other words that there is no carrier that belongs to the first ring of two separate pilots. Furthermore, the use of a regular pattern of pilots is a means of obtaining transmission channel estimates at regularly distributed locations in the time-frequency space, which facilitates the use of interpolation in order to obtain a channel estimate over the entire time-frequency network.

The invention also relates to a process for the construction of a multicarrier signal consisting of a temporal succession of symbols formed by a set of data elements, each of said data elements modulating a carrier frequency of said signal, said data elements comprising firstly reference elements called pilots, for which the value at emission is known by at least one receiver that will receive said signal, and secondly by informative data elements for which the value at emission is not known in advance by said receiver(s), one of said carrier frequencies modulated, at a given point in time, by one of said data elements being called a carrier.

According to the invention, at least one constraint is applied on the value of at least one of said informative data elements, so as to obtain the reduction of at reception at least one interference term affecting at least one of said pilots.

Advantageously, said informative data elements belonging to a set of at least one ring comprising said carriers adjacent to a determined pilot form a first vector, obtained by taking the product of a determined interference cancellation matrix, and of a second vector composed of a set of source informative data elements, the value of at least one of said source informative data elements being set.

Thus, when informative data is put into frames for construction of a multicarrier signal, a linear transformation is made in the form of a product of a vector comprising data elements to be transmitted, and an interference cancellation matrix.

Preferably, said matrix is a unit matrix, with the value of the coefficients of said matrix depending on a prototype function associated with said multicarrier signal, and at least one of said source informative data elements being equal to zero; even more preferably, said matrix is symmetrical and orthonormal.

In this manner, energy conservation is guaranteed. The value of a source informative data element is fixed, the values of the other data elements being related to each other through coefficients of the symmetric orthonormal matrix.

The invention also relates to a process for reception of a multicarrier signal like that described above, using an estimate of the transfer function of a transmission channel, comprising a step to determine the value of at least some coefficients of said transfer function, and for at least some of said pilots applying a division of the value of said reference elements in reception by the value of said reference elements known when they are sent, so as to obtain a good estimate of said channel.

Dividing the value of the reference elements in reception by the value of the reference elements in emission thus gives a more accurate result than is possible with methods according to prior art due to the particular structure of the multicarrier signal, which enables cancellation and/or reduction of the intrinsic interference affecting the pilots.

Advantageously, this type of reception process also comprises a step for interpolation of said coefficients in time and in frequency so as to obtain an estimate of said channel over said entire time-frequency space.

By dividing the value of the reference elements in reception by the value of the reference elements known in emission, an estimate is obtained of the transfer function of the channel at the reference locations alone, corresponding to the position of the pilots in the time-frequency network. Therefore, this channel estimate has to be extended to include the entire time-frequency network, by carrying out an interpolation step.

According to one advantageous variant, said interpolation step comprises an interpolation sub-step in time and an interpolation sub-step in frequency.

These two sub-steps are then carried out in sequence. A time interpolation can be carried out first followed by a frequency interpolation, or vice versa.

According to a second advantageous variant, said interpolation step consists of making a simultaneous interpolation in time and in frequency.

Preferably, said interpolation step applies a digital filtering sub-step.

Advantageously, this type of reception process takes account of said constraint(s) during demodulation and/or decoding of said informative data elements.

According to one advantageous technique, said signal is built according to the above mentioned construction process, and such a reception process also comprises a step to retrieve said source informative data elements, in which an inverse matrix of said determined interference cancellation matrix is applied to a received vector corresponding to said first vector.

This type of operation is thus the inverse of the operation implemented when the signal is framed, and therefore consists of applying a linear transformation that is the inverse of the transformation applied to the source informative data elements when the multicarrier signal was constructed, to the received data elements.

The invention also relates to a receiver and an emission device for a multicarrier signal such as described previously.

BRIEF DESCRIPTION OF THE DRAWINGS

Other characteristics and advantages of the invention will become clearer after reading the following description of a preferred embodiment, given as a simple illustrative and non-limitative example, and the attached drawings, wherein:

FIG. 1, already described above, presents an example signal generation, including pilots distributed in a COFDM DVB-T frame;

DETAILED DESCRIPTION OF THE PREFERRED EMBODIMENTS

Figure 2:
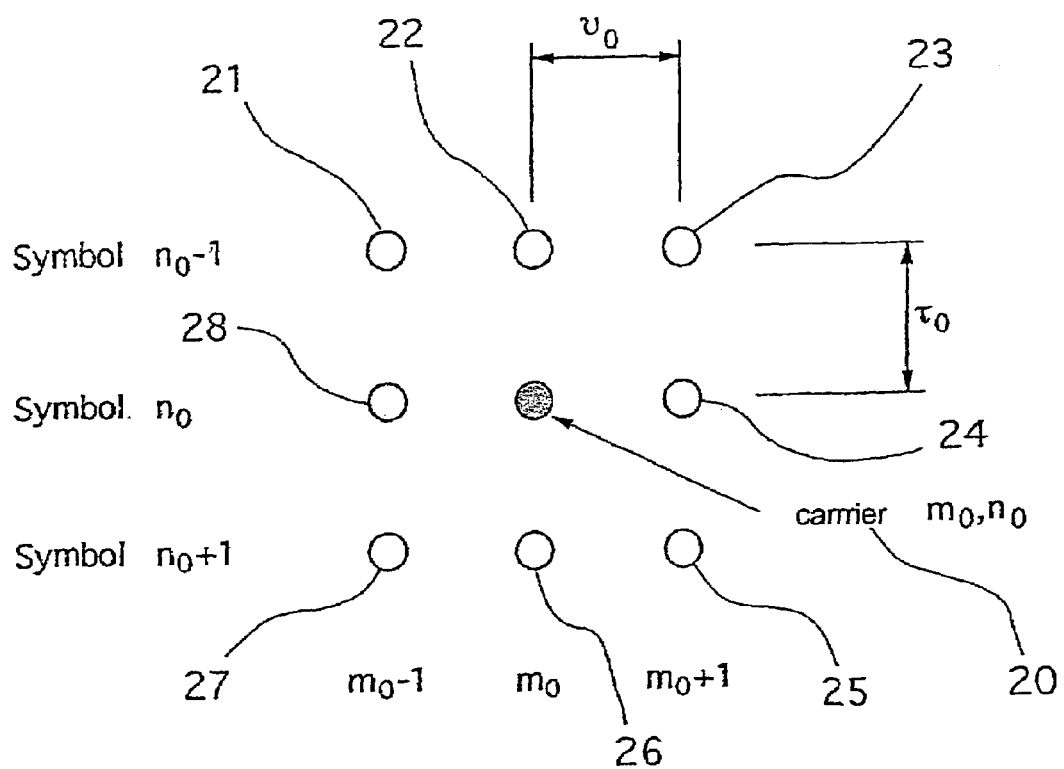
FIG. 2 illustrates the first ring related to a given carrier, in which an attempt is made to limit the intrinsic interference for a signal like that presented in FIG. 1.

The general principle of the invention is based on cancellation of the intrinsic interference due to at least the first ring on some reference carriers in the time-frequency plane, called pilots, particularly for an OFDM/OQAM type multicarrier signal.

We will describe an embodiment for limitation of the intrinsic interference on a set of scattered pilots of a multicarrier signal, with reference to FIGS. 1 and 2.

Throughout the rest of this document, we will be particularly concerned with an OFDM/OQAM type signal. It will be assumed that all multiplex carriers considered are modulated, in order to simplify the notations. But on the contrary, according to one more realistic embodiment, it may be necessary to use sub sampling, so as to prevent spectral folding inherent to digital generation of the signal from deteriorating the edge carriers. This type of under sampling also facilitates low pass filtering of the signal.

We will start with a reminder of a few concepts about intrinsic interference.

The Ambiguity Function

The definition and characteristics of the ambiguity function of a waveform are described for example in patent document No. FR 2 733 869. As a reminder, this information is summarized in appendix 1 of this patent application. However, the following is an expression of the ambiguity function of the function x(t):

$$A_x(\tau, \nu) = \int_R e^{-2i\pi\nu t} x(t+\tau/2) x^*(t-\tau/2) d t$$

We will also mention a few properties of the ambiguity function:

- if a function x is even, its ambiguity function is real;
- if x is also real, its ambiguity function is even according to the frequency variable $\nu$;
- if x is also isotropic (in other words if x is equal to its Fourier transform), its ambiguity function is even according to the time variable $\tau$.

In the following, it will be assumed that the prototype function g(t) associated with the multicarrier signal considered satisfies these properties. This is the case particularly for the Iota waveform $\Im(t)$ described in patent document No. FR 2 733 869.

Orthogonality of the Sub-carriers

The complex scalar product of the $g_{m,n}(t)$ and $g_{m',n'}(t)$ translated functions is equal to:

$$\langle g_{m,n}|g_{m',n'}\rangle = \int_{\mathcal{R}} g_{m,n}(t) \cdot g^*_{m',n'}(t) d\,t \qquad (III)$$

$$\langle g_{m,n}|g_{m',n'}\rangle = \int_{\mathcal{R}} i^{(m-m')+(n-n')} e^{2i\pi(m-m')v_0 t} g(t-n\tau_0) g^*(t-n'\tau_0) d\,t$$

Equation (III) is used and a variable change is made $u=t-(n+n')\tau_0/2$, to obtain:

$$\langle g_{m,n}|g_{m',n'}\rangle = i^{(m,m')+(n-n')} \int_{\mathcal{R}} e^{2i\pi(m-m')v_0(u+(n+n')\tau_0/2)} g\left(u+\left(\frac{n+n'}{2}-n\right)\tau_0\right) g^*\left(u+\left(\frac{n+n'}{2}-n'\right)\tau_0\right) d\,i \qquad (IV)$$

$$\langle g_{m,n}|g_{m',n'}\rangle = i^{(m,m')+(n-n')} \int_{\mathcal{R}} e^{2i\pi(m-m')v_0(u+(n+n')\tau_0/2)} g\left(u+\left(\frac{n+n'}{2}-n\right)\tau_0\right) g^*\left(u+\left(\frac{n+n'}{2}-n'\right)\tau_0\right) d\,i$$

or:

$$\langle g_{m,n}|g_{m',n'}\rangle = i^{(m-m')+(n-n')+(m-m')(n+n')} A_g((n'-n)\tau_0, (m'-m)v_0)$$

One necessary condition for the family of functions $\{g_{m,n}(t)\}$ to be orthogonal in the real sense is that g(t) should be even and $A_g(2mv_0, 2n\tau_0)=\delta_{m,0}\delta_{n,0}$.

In this case, it is verified that

∀(m,n) integers $(g_{m,n}|g_{m',n'})_R = Re(i^{(m-m')+(n-n')+(m-m')(n+n')}A_g((n'-n)\tau_0, (m'-m)v_0))=\delta_{m,m'}\delta_{n,n'}$ In the following, it will be assumed that g(t) is such that these assumptions are satisfied. This is the case particularly when g(t) is the Iota function.

Intrinsic Interference (ISI) for an Ideal Channel

For an ideal channel, the interference on the studied carrier ($m_0$, $n_0$) caused by other carriers in the time-frequency network is expressed by $I_{m_0,n_0}$ in equation (II):

$$I_{m_0,n_0} = \sum_{(m,n)\neq(m_0,n_0)} a_{m,n} \int g_{m,n}(t) g^*_{m_0,n_0}(t)$$

Given the assumed strongly localized nature of g(t) in time and in frequency, the terms that have a significant influence in this interference are due to the carriers directly adjacent to the carrier ($m_0, n_0$). These carriers are illustrated diagrammatically in FIG. 2; they form what we will call the "first ring" related to the studied carrier.

We will thus consider the carrier reference 20, for which the position in the time space is indicated by $n_0$, and for which the position in the frequency space is indicated by $m_0$. This type of carrier 20 corresponds to a pilot, in other words it transports a data element for which the value on emission is known to the receiver. Carrier references 21 to 28, which are directly adjacent to the pilot 20, form the first ring of this pilot. They belong to the OFDM symbols with indexes $n_0-1$ and $n_0+1$, and correspond to the carrier frequencies with indexes $m_0$, $m_0-1$ and $m_0+1$.

The interference term representative of the first ring, in other words the interference term due to carrier references 21 to 28, is denoted $C_{m_0,n_0}$, and the interference term due to the other carriers in the time-frequency network is denoted $D_{m_0,n_0}$.

We have $$C_{m_0,n_0} = \sum_{(m,n)\in Ring_{m_0,n_0}} a_{m,n} i^{(m-m_0)+(n-n_0)+(m-m_0)(n+n_0)} A_g((n_0-n)\tau_0, (m_0-m)v_0)$$

where $Ring_{m_0,n_0}=\{(m,n) \text{ such that}((m-m_0),(n-n_0))\in\{-1,0,1\}^2$ and $(m,n)\neq(m_0,n_0)\}$ Assume that $a_{m,n}$ values are BPSK (Binary Phase Shift Keying) symbols within the $\{-\sqrt{e}, +\sqrt{e}\}$ interval, where e represents the energy of symbols transmitted on each of the carriers. Obviously, the values $a_{m,n}$ may be symbols with any other nature, but for simplification purposes, all we will do here is to describe the particular embodiment in which $a_{m,n}$ values may only be equal to one of two distinct values. Obviously, the invention is also applicable to the case in which the $a_{m,n}$ values may be one of several different values, for example 4. If g(t) is the Iota function, we can demonstrate the following, if there is only one pilot at ($m_0,n_0$):

$\text{Var}_{dB}(D_{m_0,n_0})-\text{Var}(C_{m_0,n_0})-18.6 \text{ dB}$

This result will remain valid if there are several pilots scattered in the frame, and if they have the same energy as the useful carriers. If the energy of the pilots is greater than the energy of the useful carriers, the value of 18.6 dB will be slightly modified (as a function of the ratio of the energies and the pilot insertion pattern). The objective of the remaining part of this example embodiment is to attempt to reduce the ISI due to this "first ring".

The characteristics of g(t) (real, even and isotropic) mean that:

$A_g(0,v_0)=A_g(0,-v_0)$, that we will denote $\alpha_1$, $A_g(\tau_0,0)=A_g(-\tau_0,0)$, that we will denote $\alpha_2$, $A_g(\tau_0,v_0)=A_g(-\tau_0,v_0)=A_g(-\tau_0,-v_0)=A_g(\tau_0,-v_0)$ that we will denote $\beta$.

The more general necessary sufficient condition to be satisfied to cancel $C_{m_0,n_0}$ is:

$$\alpha_1(a_{m_0+1,n_0}-a_{m_0-1,n_0})+(-1)^{n_0}\alpha_2(a_{m_0,n_0+1}-a_{m_0,n_0-1})-\beta$$
$$(a_{m_0+1,n_0+1}+a_{m_0-1,n_0+1}+a_{m_0+1,n_0-1}+a_{m_0-1,n_0-1})=0 \quad (V)$$

Note that with some prototype functions, particularly the Iota function, $\alpha_1$ is always equal to $\alpha_2$.

Intrinsic Interference (ISI) for a Realistic Channel

In the case of a realistic channel, and by adopting notations about modelling the action of the channel previously used in this document, the ISI (inter-symbol interference) intrinsic to the carrier $(m_0, n_0)$ is written:

$$I_{m_0,n_0}^{realistic} = \sum_{(m,n)\neq(m_0,n_0)} a_{m,n} H_{m,n} \int g_{m,n}(t) g_{m_0,n_0}^*(t)$$

The intrinsic IBS due to the first ring in this realistic case is equal to:

$$C_{m_0,n_0}^{realistic} = \sum_{(m,n)\in Ring_{m_0,n_0}} a_{m,n} H_{m,n}$$
$$i^{(m-m_0)+(n+n_0)+(m-m_0)(n+n_0)} A_g((n_0-n)\tau_0, (m_0-m)v_0)$$

It is assumed that the channel is constant on this ring, so that it becomes simple to cancel this IBS. The result is that:

$$C_{m_0,n_0}^{realistic} \approx H_{m_0,n_0} \underbrace{\sum_{(m,n)\in Ring_{m_0,n_0}} a_{m,n} i^{(m-m_0)+(n+n_0)+(m-m_0)(n+n_0)} A_g((n_0-n)\tau_0, (m_0-m)v_0)}_{C_{m_0,n_0}}$$

and therefore:

$$\int r(t) g_{m_0,n_0}^*(t) \approx H_{m_0,n_0} a_{m_0,n_0} + H_{m_0,n_0} \underbrace{C_{m_0,n_0}}_{to\,be\,canceled} + D_{m_0,n_0}^{realistic} \quad (VI)$$

With this assumption, that is satisfied in practice by choosing appropriate values of the modulation parameters, the same term $(C_{m_0,n_0})$ can be cancelled as in the ideal case.

Cancelling the ISI Due to the First Ring

In the following part of this document, it is assumed that the transmission channel is almost invariable in time on Q symbols, if Q is the time interval of the pattern of scattered pilots.

All that is necessary to cancel the ISI due to the first ring related to the carrier $(m_0,n_0)$ is to satisfy equation (V). This is done by fixing a degree of freedom on this ring, which will then transport the equivalent of 7 useful information elements (instead of 8). The direct method could be to decide to express $a_{m_0-1,n_0-1}$, for example, as a function of the other 7 elements of the ring. However, this type of operation can lead to large energy variations between this carrier and the other 7 elements. Consequently, a unique linear transformation is made to smooth this phenomenon, and thus to achieve energy conservation.

Since equation (V) depends on time, this transformation will be different depending on whether pilots are placed on even or odd symbols. One transformation example is given below for even symbols (in other words when the index $n_0$ characteristic of the position of the pilot considered in the time space is even)

$$\begin{pmatrix} a_{m0-1,n0-1} \\ a_{m_0,n0-1} \\ a_{m0+1,n0-1} \\ a_{m0-1,n0} \\ a_{m0+1,n0} \\ a_{m0-1,n0+1} \\ a_{m_0,n0+1} \\ a_{m0+1,n0+1} \end{pmatrix} = M_0 \begin{pmatrix} e_0 \\ e_1 \\ e_2 \\ e_3 \\ e_4 \\ e_5 \\ e_6 \\ e_7 \end{pmatrix} \text{ where}$$

$$M_0 = \frac{1}{\sqrt{2\alpha_1^2 + 2\alpha_2^2 + 2\beta^2}} \begin{pmatrix} \alpha_1 & \beta & \alpha_1 & -\beta & \beta & -\alpha_2 & -\beta & -\alpha_2 \\ \beta & -\alpha_2 & -\beta & -\alpha_1 & -\alpha_1 & \beta & -\alpha_2 & -\beta \\ \alpha_1 & -\beta & -\alpha_1 & \beta & \beta & -\alpha_2 & -\beta & \alpha_2 \\ -\beta & -\alpha_1 & \beta & \alpha_2 & \alpha_2 & \beta & -\alpha_1 & -\beta \\ \beta & -\alpha_1 & \beta & \alpha_2 & -\alpha_2 & -\beta & \alpha_1 & -\beta \\ -\alpha_2 & \beta & -\alpha_2 & \beta & -\beta & -\alpha_1 & -\beta & -\alpha_1 \\ -\beta & -\alpha_2 & -\beta & -\alpha_1 & \alpha_1 & -\beta & -\alpha_2 & -\beta \\ -\alpha_2 & -\beta & \alpha_2 & -\beta & -\beta & -\alpha_1 & -\beta & \alpha_1 \end{pmatrix}$$

where it is assumed that $e_6$ is equal to zero. The values of $e_0$, $e_1$, $e_2$, $e_3$, $e_4$, $e_5$, $e_7$ are taken from the $$\{-\sqrt{e}, +\sqrt{e}\}$$

alphabet, in which e denotes the energy of the symbols transmitted on each of the carriers.

For odd symbols (in other words when the index $n_0$ characteristic of the position of the pilot considered in the time space is odd), it is represented for example by the following transformation:

$$\begin{pmatrix} a_{m0-1,n0-1} \\ a_{m_0,n0-1} \\ a_{m0+1,n0-1} \\ a_{m0-1,n0} \\ a_{m0+1,n0} \\ a_{m0-1,n0+1} \\ a_{m_0,n0+1} \\ a_{m0+1,n0+1} \end{pmatrix} = M_1 \begin{pmatrix} e_0 \\ e_1 \\ e_2 \\ e_3 \\ e_4 \\ e_5 \\ e_6 \\ e_7 \end{pmatrix} \text{ where}$$

$$M_0 = \frac{1}{\sqrt{2\alpha_1^2 + 2\alpha_2^2 + 2\beta^2}} \begin{pmatrix} -\alpha_1 & -\beta & -\alpha_1 & \beta & -\beta & -\alpha_2 & \beta & -\alpha_2 \\ -\beta & -\alpha_2 & \beta & \alpha_1 & \alpha_1 & -\beta & -\alpha_2 & \beta \\ -\alpha_1 & \beta & \alpha_1 & -\beta & -\beta & -\alpha_2 & \beta & \alpha_2 \\ \beta & \alpha_1 & -\beta & \alpha_2 & \alpha_2 & -\beta & \alpha_1 & \beta \\ -\beta & \alpha_1 & -\beta & \alpha_2 & -\alpha_2 & \beta & -\alpha_1 & \beta \\ -\alpha_2 & -\beta & -\alpha_2 & -\beta & \beta & \alpha_1 & \beta & \alpha_1 \\ \beta & -\alpha_2 & \beta & \alpha_1 & -\alpha_1 & \beta & \alpha_2 & \beta \\ -\alpha_2 & \beta & \alpha_2 & \beta & \beta & \alpha_1 & \beta & -\alpha_1 \end{pmatrix}$$

where $e_6$ is also assumed to be equal to zero.

According to one preferred embodiment, which achieves conservation of energy, the matrices $M_0$ and $M_1$ are chosen to be symmetrical and orthogonal.

In terms of spectral efficiency, this method consists of fixing the value of 2 reals per pilot (the data element transported by the pilot itself and the data element transported by the dedicated carrier in the first ring), which is equivalent to what is done in a conventional QFDM/QAM system (for example according to the DVB-T standard) in which the complex value of the pilot (namely 2 reals corresponding to the real part and the imaginary part respectively of the pilot) is fixed.

Channel Estimate

The values received on each pilot can then be used to find the coefficients $H_{n,k}$, simply by dividing by the known emitted value, and these coefficients then give a good channel estimate since the intrinsic interference on these pilots is reduced.

The energy of these pilots in proportion to the average energy of carriers transporting the useful information can be boosted to provide better protection of these pilots against channel distorsions.

A channel estimate for all carriers in the time-frequency network can be made by making an interpolation in time and in frequency between the different channel estimates on the pilot carriers. For example, this interpolation can be made in time and then in frequency, or in time and frequency simultaneously.

Framing

For a broadcasting or transmission system based on OFDM/OQAM modulation, framing based on the particular channel estimate described above includes:

pilots scattered within useful carriers according to a regular pattern like that illustrated in FIG. 1. Thus, for example, it can be seen in the example in FIG. 1 that the position of a pilot is offset by three steps towards the right in the frequency space, to move from one symbol to the next symbol.

Shannon's theorem states that:

the inverse of the space between two pilots in time is greater than the spectral spreading of the channel, in other words twice the maximum Doppler frequency;

the inverse of the space between two pilots in frequency is greater than the time spreading of the channel response, in other words the maximum significant delay (with average duration assumed to be known for example by prior propagation measurements);

On these pilots, the intrinsic ISI cancellation procedure due to the first ring is applied as described above.

These pilots may also be boosted, if necessary, by:

carriers transporting the useful information;

if applicable, carriers dedicated to other reception operations, for example such as recuperation of synchronization.

APPENDIX 1

REMINDERS ABOUT THE AMBIGUITY FUNCTION

1. DEFINITIONS

Consider a function x(t) and its Fourier transform X(f). Its time and frequency products defined as follows can be associated with it:

$$\gamma_x(t,\tau) = x(t+\tau/2)\, x^*(t-\tau/2)$$

$$\Gamma_x(f,v) = X(f+v/2)\, X^*(f-v/2)$$

The Wigner-Ville transform and the ambiguity function of x are then given by:

$$\begin{cases} W_x(t,f) = \int \gamma_x(t,\tau) e^{-2i\pi f\tau} d\tau = \int \Gamma_x(f,v) e^{2i\pi vt} dv \\ A_x(\tau,v) = \int \gamma_x(t,\tau) e^{-2i\pi vt} dt = \int \Gamma_x(f,v) e^{2i\pi f\tau} df \end{cases}$$

2. SYMMETRY PROPERTIES OF THE AMBIGUITY FUNCTION

Consider a function x(t). The functions defined as follows will be denoted by $x^-$ and $\tilde{x}$ respectively.

$$\begin{cases} x^-(t) = x(-t) \\ \tilde{x}(t) = x^*(-t) \end{cases}$$

We then get the relations:

$$A_x(\tau,v) = \int e^{-2i\pi vt} x(t+\tau/2)\, x^*(t-\tau/2) dt$$

$$A_x(\tau,v) = \int e^{2i\pi vu} x(-u+\tau/2) x^*(-u-\tau/2) du =$$

By setting u = -t;

$$\int e^{2i\pi vu} x(u-\tau/2) x^*(u+\tau/2) du = A_x^*(\tau,v)$$

In particular, it will be concluded that if a function x is even, in other words $x = \tilde{x}$, its ambiguity function is real. Furthermore, the following relation is noted:

$$A_{x^-}(\tau,v) = \int e^{-2i\pi vt} x^*(u+\tau/2) x(u-\tau/2) du = A_x(-\tau,v)$$

These two relations can be combined to obtain:

$$A_{\bar{x}}(\tau,v) = A_x(\tau,-v)$$

3. AMBIGUITY FUNCTION AND FOURIER TRANSFORM

The definition of the ambiguity function can be rewritten as follows:

$$A_x(\tau,v) = \int \Gamma_x(f,v) e^{2i\pi f \tau} df = \int \gamma_X(f,v) e^{2i\pi f \tau} df = A_X(v,-\tau)$$

or $A_X(\tau,v) = A_x(-v,\tau)$

4. AMBIGUITY FUNCTION AND TIME-FREQUENCY TRANSLATION

We will consider a translated function of an arbitrary prototype function x(t), namely:

$$x_k = e^{i\varphi_k} e^{2i\pi v_k t} x(t-\tau_k)$$

The associated ambiguity function is written:

$$A_{x_k}(\tau,v) = \int e^{-2i\pi v t} e^{i\varphi_k} e^{2i\pi v_k(t+\tau/2)} x(t-\tau_k+\tau/2) e^{-i\varphi_k} e^{-2i\pi v_k(t-\tau/2)} x^*(t-\tau_k-\tau/2) dt =$$

$$\int e^{-2i\pi v t} e^{2i\pi v_k \tau} x(t-\tau_k+\tau/2) x^*(t-\tau_k-\tau/2) dt$$

or by setting $u = t-\tau_k$:

$$A_{x_k}(\tau,v) = e^{2i\pi(v_k\tau-v\tau_k)} \int e^{-2i\pi v u} x(u+\tau/2) x^*(u-\tau/2) du = e^{2i\pi(v_k\tau-v\tau_k)} A_x(\tau,v)$$

5. ORTHOGONALITY AND AMBIGUITY FUNCTION

General case

We will consider two translated functions of the same function x(t), namely:

$$x_k = e^{i\varphi_k} e^{2i\pi v_k t} x(t-\tau_k)$$
$$x_{k'} = e^{i\varphi_{k'}} e^{2i\pi v_{k'} t} x(t-\tau_{k'})$$

The scalar product of these two functions is written:

$$\langle x_k | x_{k'} \rangle = e^{i(\varphi_k-\varphi_{k'})} \int e^{2i\pi(v_k-v_{k'})t} x(t-\tau_k) x^*(t-\tau_{k'}) dt$$

or by setting: $u = t - (\tau_k + \tau_{k'})/2$:

$$\langle x_k | x_{k'} \rangle = e^{i(\varphi_k - \varphi_{k'})} e^{2i\pi(\nu_k - \nu_{k'})(\tau_k + \tau_{k'})} \int e^{2i\pi(\nu_k - \nu_{k'})u} x(u + (\tau_{k'} - \tau_k)/2) x^*(u - (\tau_{k'} - \tau_k)/2) du$$
$$= e^{i(\varphi_k - \varphi_{k'})} e^{2i\pi(\nu_k - \nu_{k'})(\tau_k + \tau_{k'})} A_x(\tau_{k'} - \tau_k, \nu_{k'} - \nu_k)$$

The invention claimed is:

1. Process for transmitting a multicarrier signal comprising a temporal succession of symbols formed by a set of data elements, each of said data elements modulating a carrier frequency of said multicarrier signal, said data elements comprising firstly reference elements called pilots, for which the value at emission is known to at least one receiver that will receive said signal, and secondly informative data elements for which the value at emission is not known to said receiver in advance, one of said carrier frequencies modulated, at a given point in time, by one of said data elements being called a carrier, characterised in that, for at least one of said pilots, the transmitting process comprises the following steps:

determining a set of carriers close to said pilot in time-frequency space and being each modulated by one of said informative data elements;

imposing at least one constraint on the value of at least one of said informative data elements modulating carriers from the set of carriers, as a function of the other informative data elements modulating carriers from the set of carries, in order to reduce at reception at least one interference term affecting said pilot.

2. Transmitting process according to claim 1, characterised in that the multicarrier signal is an Orthogonal Frequency Division Multiplexing/Offset Quadrature Amplitude Modulation type signal.

3. Transmitting process according to claim 1, characterised in that one of said constraints consists, for at least one pilot, of cancelling an interference term at least partially due to the carriers directly neighboring said pilot in a time-frequency space.

4. Transmitting process according to claim 1, characterised in that the multicarrier signal has the form:

$$S(t) = \sum_n \sum_{m=0}^{M-1} a_{m,n} e^{i\varphi_{m,n}} e^{2i\pi m v_0^t} g(t - \tau n_0)$$

where g is a predetermined prototype function such that said carriers are orthogonal, and where the terms $a_{m,n}$ are real and represent said data elements, $\tau_0$ being the duration of one of said symbols and $v_0$ being the spacing between said carrier frequencies, with $1/(v_0\tau_0)=2$, and where $(\Phi_{m,n}=(\pi/2)^*(m+n))$, where m and a are characteristic of the position in the frequency space and in the time space respectively of the carrier bearing the data element $a_{m,n}$.

5. Transmitting process according to claim 4, characterised in that the multicarrier signal respects the following constraint:

$$\alpha_1(a_{m_0+1,n_0}-a_{m_0-1,n_0})+(-1)^{n_0}\alpha_2(a_{m_0,n_0+1}-a_{m_0,n_0-1})-\beta$$
$$(a_{m_0+1,n_0+1}+a_{m_0-1,n_0+1}+a_{m_0+1,n_0-1}-a_{m_0-1,n_0-1})=0$$

$$A_g(0,v_0)=A_g(0,-v_0)=\alpha_1$$

where $$A_g(\tau_0,0)=A_g(-\tau_0,0)=\alpha_2$$

$$A_g(\tau_0,v_0)=A_g(-\tau_0,v_0)=A_g(-\tau_0,-v_0)=A_g(\tau_0,-v_0)=\beta$$

and in which $A_g$ is the ambiguity function of said function g, ma and $a_0$ being characteristic of the pilot for which the interference is to be cancelled.

6. Transmitting process according to claim 4, characterised in that said function g is a real, and isotropic even-parity function.

7. Transmitting process according to claim 4, characterised in that said function g is an Iota function.

8. Transmitting process according to claim 1, characterised in that said constraint is respected using a linear transformation to fix at least one degree of freedom on a set containing at least one ring comprising said carriers neighboring said pilot.

9. Transmitting process according to claim 5, characterised in that said constraint is respected by applying a linear transformation to fix a degree of freedom on a ring containing said carriers directly adjacent to said pilot.

10. Transmitting process according to claim 8, characterised in that said linear transformation is unitary.

11. Transmitting process according to claim 1, characterised in that an energy associated with each of said pilots is significantly greater than the average energy of said carriers modulated by an informative data element.

12. Transmitting process according to claim 1, characterised in that said pilots form a regular pattern in time-frequency space, two consecutive pilots firstly in a time space, and secondly in a frequency space, being separated by at least two carriers.

13. Process for making a multicarrier signal comprising a temporal succession of symbols formed by a set of data elements, each of said data elements modulating a carrier frequency of said multicarrier signal, said data elements comprising firstly reference elements called pilots, for which the value on emission is known by at least one receiver that will receive said signal, and secondly by informative data elements for which the value on emission is not known in advance by said receiver, one of said carrier frequencies modulated at a given point in time by one of said data elements being, called a carrier, characterised in that, for at least one of said pilots, the process comprises:

determining a set of carriers close to said pilot in time-frequency space and being each modulated by one of said informative data elements;

imposing at least one constraint on the value of at least one of said informative data elements modulating carriers from the set of carriers, as a function of the other informative data elements modulating carriers from the set of carriers, in order to reduce at reception at least one interference term affecting said pilot.

14. Process according to claim 13, characterised in that said informative data elements belonging to a set of at least one ring comprising said carriers neighboring a determined pilot form a first vector, obtained by taking the product of a determined interference cancellation matrix, and of a second vector composed of a set of source informative data elements, the value of at least one of said source informative data elements being fixed.

15. Process according to claim 14, characterised in that said matrix is a unit matrix, with the value of the coefficients of said matrix depending on a prototype function associated with said multicarrier signal, and at least one of said source informative data elements being equal to zero.

16. Process according to claim 15, characterised in that said matrix is symmetrical and orthonormal.

17. Process for reception of a multicarrier signal according to claim 1, characterised in that the reception process uses an estimate of the transfer function of a transmission channel, comprising a step to determine the value of at least some coefficients of said transfer function, and for at least some of said pilots applying a division of the value of said reference elements in reception by the value of said reference elements known when they are sent, so as to obtain a good estimate of the said channel.

18. Reception process according to claim 17, characterised in that the reception process comprises a step for interpolation of said coefficients in time and in frequency so as to obtain an estimate of said channel over said entire time-frequency space.

19. Reception process according to claim 18, characterised in that said interpolation step comprises an interpolation sub-step in time and an interpolation sub-step in frequency.

20. Reception process according to claim 18, characterised in that said interpolation step consists of making a simultaneous interpolation in time and in frequency.

21. Reception process according to claim 18, characterized in that said interpolation step applies a digital filtering sub-step.

22. Reception process according to claim 17, characterized in that the reception process takes account of said at least one constraint during demodulation or decoding of said informative data elements.

23. Reception process according to claim 17, characterised in that said informative data elements belonging to a set of at least one ring comprising said carriers neighboring a determined pilot form a first vector, obtained by taking the product of a determined interference cancellation matrix, and of a second vector composed of a set of source informative data elements, the value of at least one of said source informative data elements being fixed, and such a reception process also comprises a step to retrieve said source informative data elements, in which an inverse matrix of said determined interference cancellation matrix is applied to a received vector corresponding to said first vector.

24. Emission device for emitting a multicarrier signal comprising a temporal succession of symbols formed by a set of data elements, each of said data elements modulating a carrier frequency of said multicarrier signal, said data elements comprising firstly reference elements called pilots, for which the value at emission is known to at least one receiver that will receive said signal, and secondly informative data elements for which the value at emission is not known to said receiver in advance, one of said carrier frequencies modulated, at a given point in time, by one of said data elements being called a carrier, wherein the emission device comprises, for at least one of said pilots:

means for determining a set of carriers close to said pilot in time-frequency space and being each modulated by one of said informative data elements; and means for imposing at least one constraint on the value of at least one of said informative data elements modulating carriers from the set of carriers, as a function of the other informative data elements modulating carriers from the set of carriers, in order to reduce at reception at least one interference term affecting said pilot.

* * * * *

UNITED STATES PATENT AND TRADEMARK OFFICE
CERTIFICATE OF CORRECTION

PATENT NO. : 7,272,188 B2
APPLICATION NO. : 10/381178
DATED : September 18, 2007
INVENTOR(S) : Dominique Lacroix-Penther, Pierre Combelles and Michel Alard Page 1 of 1

It is certified that error appears in the above-identified patent and that said Letters Patent is hereby corrected as shown below:

Title Page, item (73),

Under Assignee:

Please delete "France Telecom, Paris (FR)" and insert -- France Telecom, Paris, (FR); Telediffusion De France, Paris (FR); and Wavecom, Issy Les Moulineaux (FR) --

Signed and Sealed this
Fifteenth Day of December, 2015

Michelle K. Lee
*Director of the United States Patent and Trademark Office*